United States Patent [19]

Villemain

[11] 4,368,086
[45] Jan. 11, 1983

[54] METHOD OF FABRICATING AN AIRCRAFT SELF-SEALING FUEL TANK

[75] Inventor: Herbert F. Villemain, Cuyahoga Falls, Ohio

[73] Assignee: The United States of America as represented by the Secretary of the Air Force, Washington, D.C.

[21] Appl. No.: 313,879

[22] Filed: Oct. 22, 1981

Related U.S. Application Data

[62] Division of Ser. No. 133,767, Mar. 25, 1980.

[51] Int. Cl.³ .................... B32B 31/10; B32B 7/08
[52] U.S. Cl. .................... 156/93; 112/405; 112/441; 220/452; 220/455; 220/456; 220/457; 220/900; 244/135 B; 428/78; 428/102; 428/192; 428/912
[58] Field of Search ............ 156/0.5, 93; 220/452, 220/453, 455, 456, 457, 900; 244/135 B; 428/912, 78, 102, 192; 112/405, 440, 441

[56] References Cited

U.S. PATENT DOCUMENTS

| | | | |
|---|---|---|---|
| 1,477,686 | 12/1923 | Braender | 220/900 X |
| 2,416,231 | 2/1947 | Smith et al. | 428/912 X |
| 2,437,058 | 3/1948 | Waters | 244/135 B X |
| 2,446,811 | 8/1948 | Crawford | 220/900 |
| 2,505,348 | 4/1950 | Cunningham | 220/461 X |
| 2,508,906 | 5/1950 | Cunningham et al. | 150/0.5 |
| 2,687,977 | 8/1954 | Gerke | 428/912 |
| 3,068,132 | 12/1962 | Warburton-Hall | 156/93 |
| 3,506,224 | 4/1970 | Harr et al. | 244/135 |
| 3,509,016 | 4/1970 | Underwood et al. | 220/900 |
| 3,563,846 | 2/1971 | Harr | 161/161 |
| 3,577,314 | 5/1971 | Evans | 161/189 |
| 3,664,904 | 5/1972 | Cook | 428/912 |
| 3,686,064 | 8/1972 | Bonnet et al. | 156/93 X |
| 3,779,420 | 12/1973 | Knaus | 220/85 B X |
| 3,787,279 | 1/1974 | Winchester | 161/160 |
| 3,801,425 | 4/1974 | Cook | 161/190 |
| 3,951,190 | 4/1976 | Suter | 220/457 |

FOREIGN PATENT DOCUMENTS

860705  1/1941  France .................... 220/900

Primary Examiner—Edward C. Kimlin
Assistant Examiner—Robert A. Dawson
Attorney, Agent, or Firm—Donald J. Singer; Robert Kern Duncan

[57] ABSTRACT

Disclosed is a fabrication technique for, and the structure of, a flexible self-sealing fuel tank having a preactivated sealant constructed by laying-up over an innerliner, positioned on a form, prefabricated panels having a self-sealant member stitched into a rubber-coated outer wrap.

2 Claims, 9 Drawing Figures

METHOD OF FABRICATING AN AIRCRAFT SELF-SEALING FUEL TANK

RIGHTS OF THE GOVERNMENT

The invention described herein may be manufactured and used by or for the Government of the United States for all governmental purposes without the payment of any royalty.

This is a division of application Ser. No. 133,767 filed Mar. 25, 1980.

BACKGROUND OF THE INVENTION

This invention relates to an aircraft fuel tank and method of fabricating the fuel tank, and more particularly to the fabrication of an improved self-sealing and flexible fuel tank using a preactivated sealant.

The U.S. patents to Harr et al, Nos. 3,506,224; Harr, 3,563,846; Evans, 3,577,314; Cook, 3,664,904; Winchester, 3,787,279; Cook, 3,801,425; and Conger et al, 3,935,050, relate to various fabricated containers such as fuel tanks.

To aid in tank installation and removal, it is desirable to impart some flexibility to fabricated fuel tanks. It is also desirable to provide improved self-sealing characteristics to fuel tanks to reduce fuel loss and danger of explosions due to ballistic damage.

BRIEF SUMMARY OF THE INVENTION

According to this invention, a fuel tank is provided which is constructed of prefabricated panels which have a self-sealant member stitched into a rubber coated outer wrap with stitched flange members provided around the periphery of the panels. The panels are sealed to an innerliner and the flanges are joined to form flexible hinge-like joints. A fuel barrier layer is applied to the outer surface of the panels. The exterior ply is then applied to the outside of the fuel barrier layer of the tank with standard laydown procedures.

IN THE DRAWINGS

DETAILED DESCRIPTION OF THE INVENTION

Figure 1:
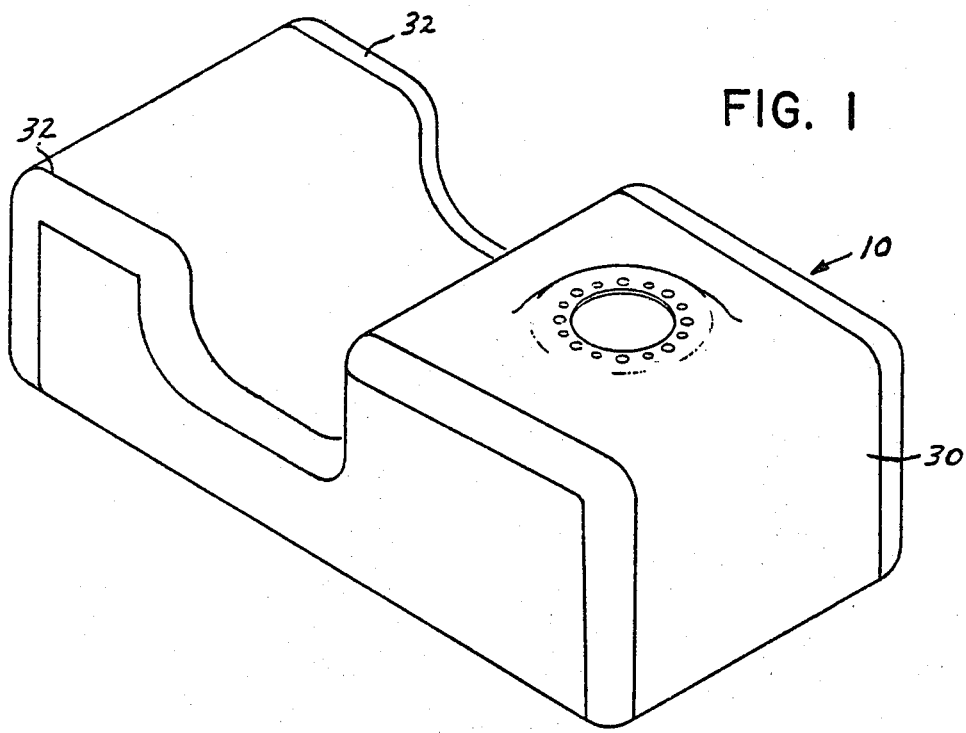
FIG. 1 is an isometric view of a fuel tank according to the invention.
Figure 2:
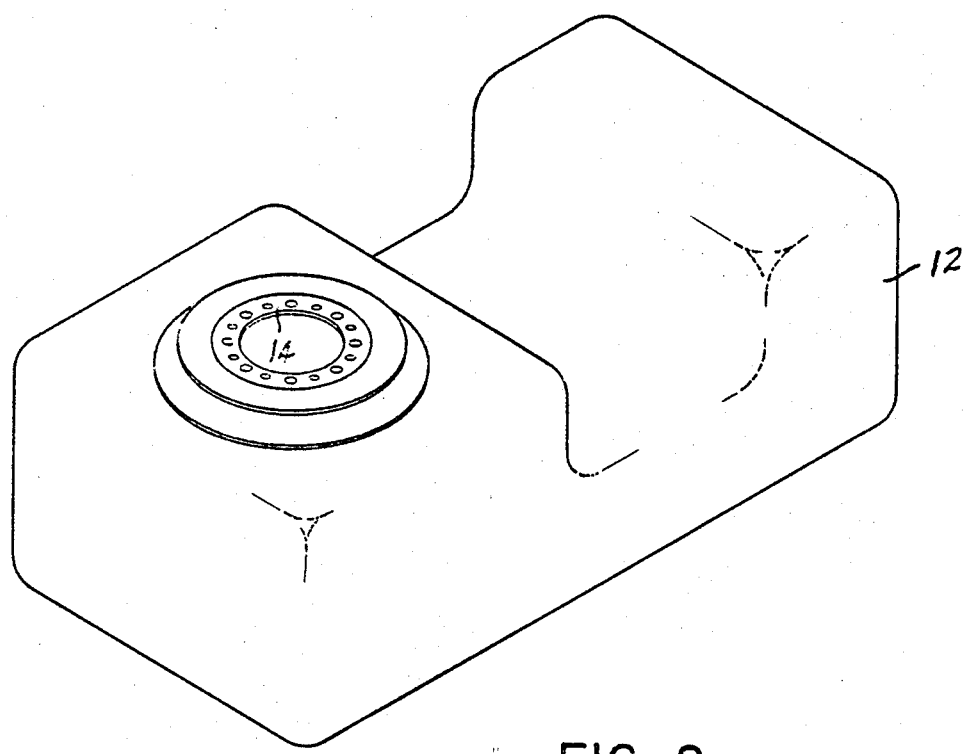
FIG. 2 is an isometric view of a fuel tank innerliner on a building form.

Reference is now made to FIG. 1 of the drawing which shows a fuel tank 10, which is constructed as shown in FIGS. 2-8. An innerliner member 12, together with a fitting 14, as shown in FIG. 2, are applied to a conventional building form, not shown, of a material such as plaster of paris. The innerliner 12 consists of sheets of 12-ounce nylon cloth fabric, rubber coated on both sides which are joined with rubber cement and with the joints gum-taped.

Figure 3:
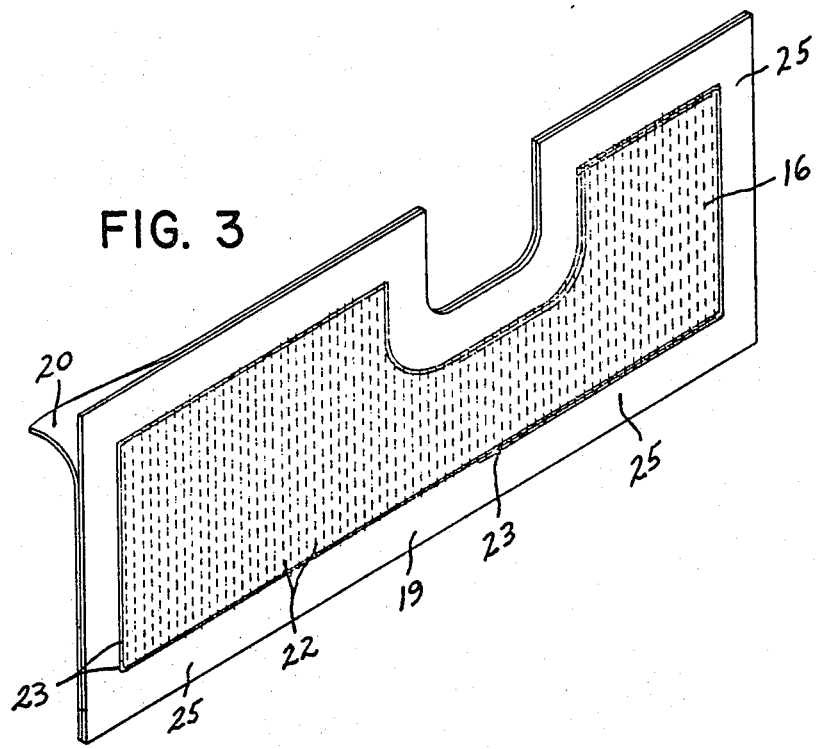
FIG. 3 shows a sealant material panel used in the device of FIG. 1.
Figure 7:
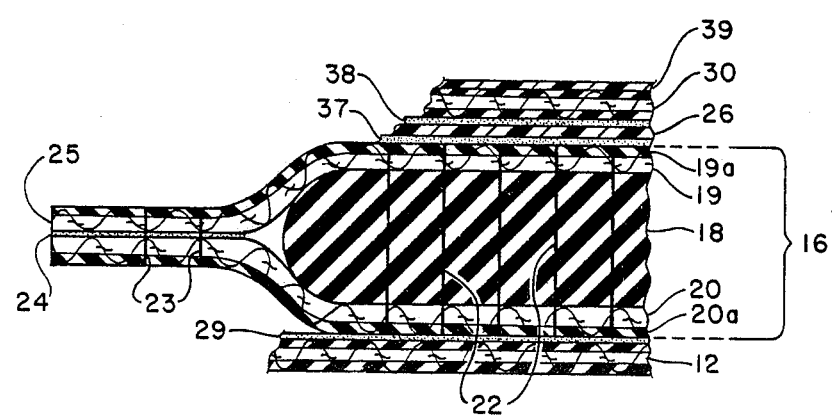
FIG. 7 is a schematic illustration showing the fabric layers used in the device of FIG. 1.

Panels 16, as shown in FIGS. 3 and 7, are made of a layer 18 of an elastomeric sealant material, such as 100% natural rubber, between two layers 19 and 20, of 12-ounce nylon cloth fabric, each rubberized on one side 19a and 20a, respectively. The layers are cut to the desired size and shape to conform to the sides of the building form with the innerliner 12 thereon. The non-rubberized side of the layers 19 and 20 are placed in contact with the sealant material 18. The edges of the layers 19 and 20 extend beyond the edge of the sealant material by approximately one and a half inch to form a flange 25. After cementing at 24 the flanges 25 together, the three layers are sewn together using parallel stitch lines 22, ¼ inch separated, 3/16 inch between stiches, with 25 pound Dacron thread, as shown in FIG. 3. Two full perimeter stitch lines 23 are located at the perimeter of the sealant material 18 at the inner part of flanges 25.

Figure 4:
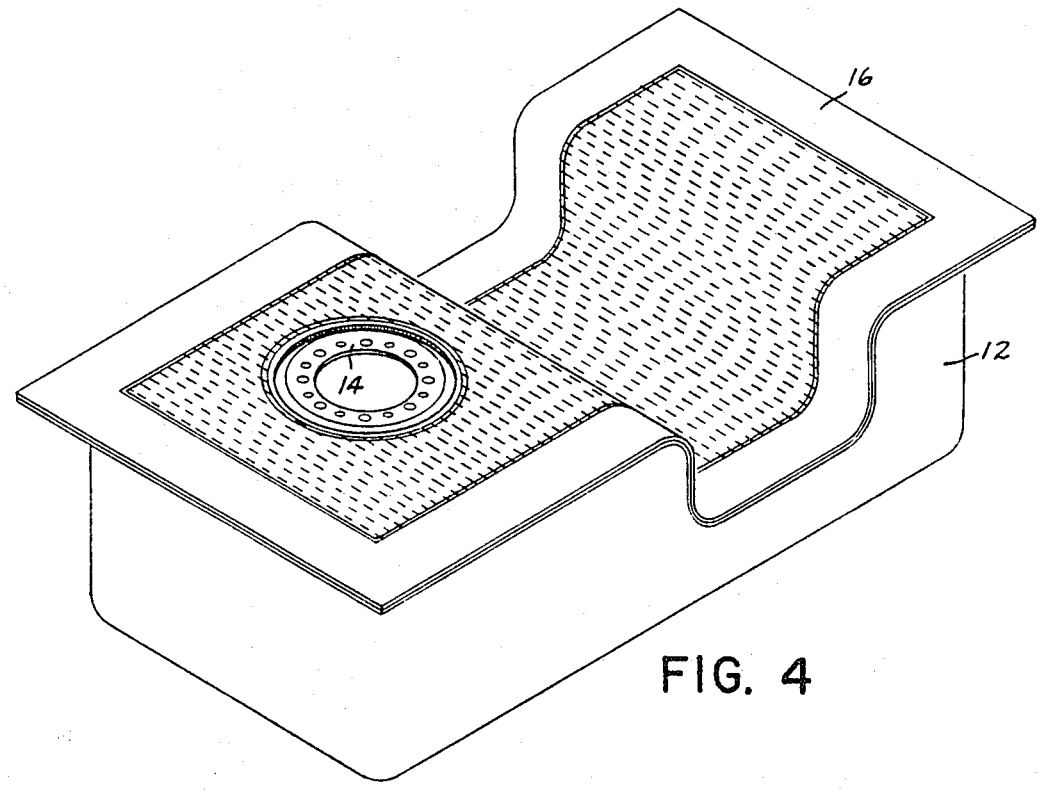
FIG. 4 shows the device of FIG. 2 with the top panel in place.

The innerliner 12 is brush-coated with rubber cement 29 and each side, end, bottom, and top are covered with a sealing panel 16, tailored to the mating tank dimensions, as shown in FIG. 4, for the top panel.

Figure 5:
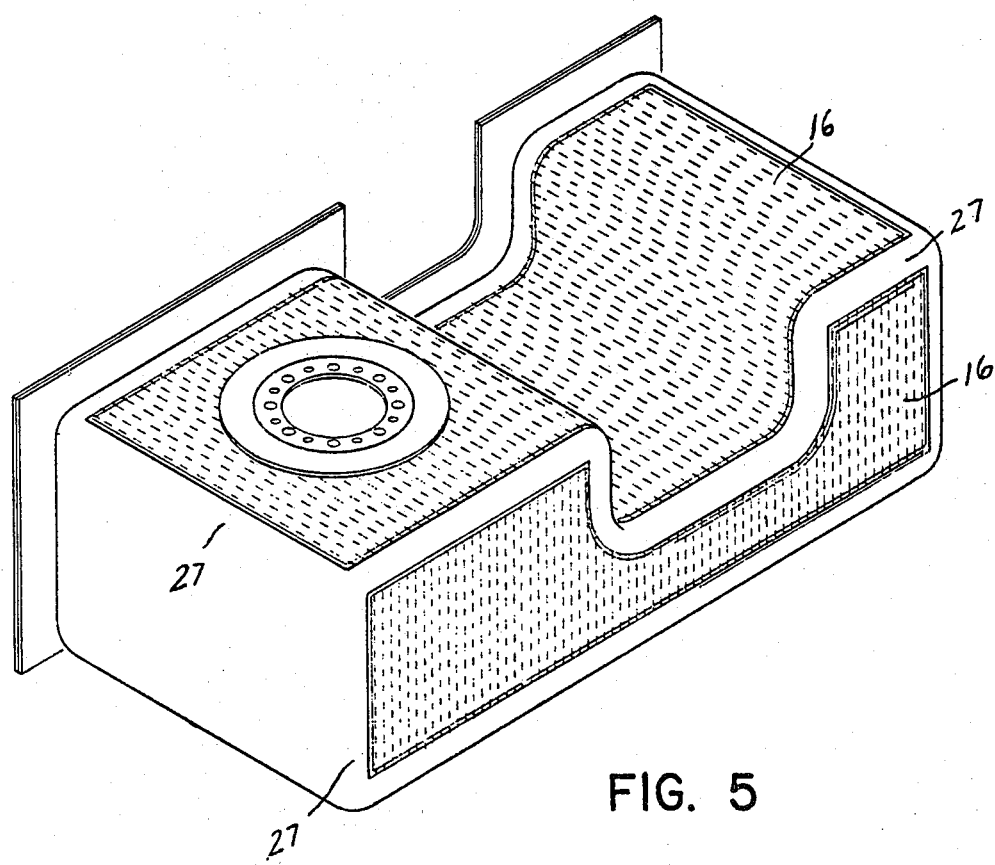
FIG. 5 shows the device of FIG. 4 with a portion of the panel flanges lap joined.
Figure 6:
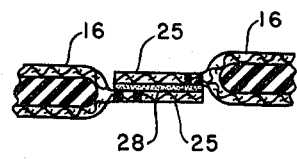
FIG. 6 shows an embodiment of a typical lap joint that may be used in joining the panels in FIG. 5.

The flanges 25 from adjoining panels 16 are typically lapped, as shown in FIG. 6, and cemented together with such as adhesive 28 to provide flexible joints 27 between the panels 16, as shown in FIG. 5. FIG. 6 illustrates the generally preferred joining lap. However, other types of lap joints, such as flange laps shown in FIG. 8 wherein the outer exposed flange of the first-laid sealing panel, as it lays, is removed and the mating flange cemented down, then the outer (or exposed) flange of the adjacent sealant panel as it would lay, is removed, and its' mating (or remaining) flange is cemented down on top of the previously laid flange. (Butt-type joints may be used but are generally not preferred.)

The tank is brush coated with several coats of rubber cement 37, as shown in the detailed cross-sectional illustration of FIG. 7, to provide a smoother surface. A conventional fuel barrier 26 of material such as nylon in a water-alcohol solution, may then be applied by brush or by swabbing with a lint-free pad. The tank is then brush-coated with rubber cement 38 and an outer layer 30 of a material the same as the innerliner 12, is cemented to the outside of the tank. All of the lap joints are gum-taped as indicated at 32 (see FIG. 1). The entire outer surface of the tank is then covered by a brush coat 39 of fuel resistant lacquer. The tank is then cured in an autoclave in open steam for two hours at 260° F. at 60 psig pressure. After curing, the building form is removed in a conventional manner such as by soaking in water until the form is readily able to be fractured by sledging with a rubber mallet. The pieces are removed by hand and the innerliner 12 is cleaned by conventionally scrubbing, if necessary, with a nonabrasive material such as a cured small roll of rubber or a textured cloth, etc.

Figure 8:
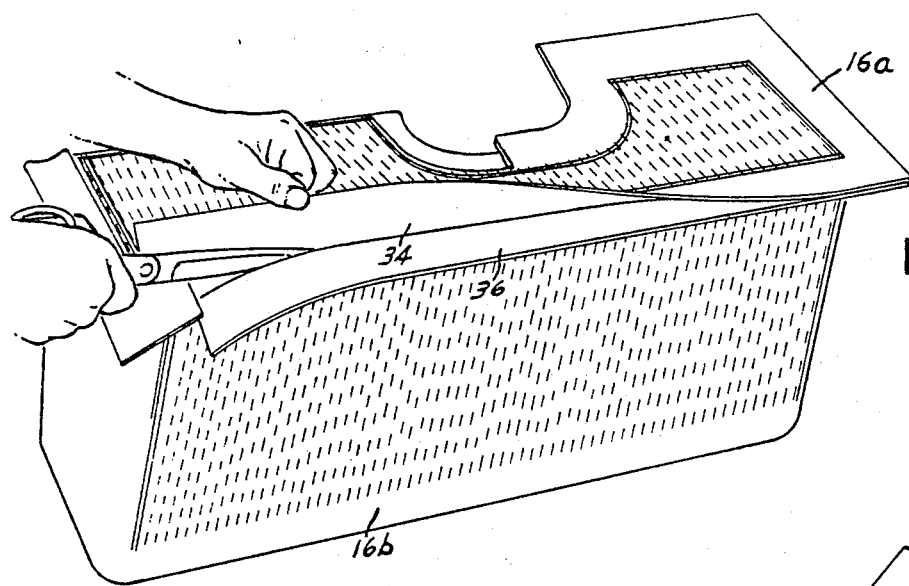
FIG. 8 shows another embodiment of the lap joints used in the device of FIG. 1.

FIG. 8 specifically shows removal of the outer flange 34 of the side panel 16a being laid. The adjacent bottom panel 16b (already emplaced) had its outer flange (as it laid) previously removed.

Figure 9:
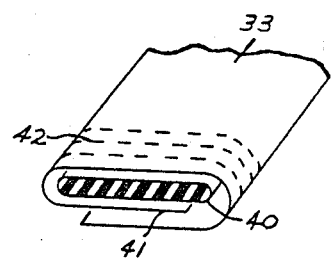
FIG. 9 shows a typical sealant strip pad.

For some applications where it is desirable to provide self-sealing ability in the lap seam areas, at the expense of reduced flexibility of construction, sealant rubber strip pads 33, as illustrated in FIG. 9, are laid longitudinally along the lap seams of joint paths and cemented down. The typical sealant strip pad is fabricated by enclosing a conventional sealant strip 40 in a fabric wrap 41 and parallel stitching them together by stiches 42. Typically, the width of the sealant strip pad 33 and the width of the joint formed by overlapping flanges 25 are approximately equal. A sealant strip pad, such as 33 shown in FIG. 9 may also be used to flush in (or fill in) those joint areas with other tank surfaces, for a smoother surface to lay on the final outer fabric ply of the construction. If the sealant is not required, or desired in the joint areas, strips of nitrile rubber are typically used to smooth in those offset areas and provide improved adhesion of the final outer fabric ply to the joint areas.

There is thus provided an aircraft self-sealing fuel tank with increased flexibility to aid in installation and removal of the tank.

I claim:

1. The method of constructing a self-sealing fuel tank, comprising:
   a. applying an innerliner member to a building form;
   b. cementing a plurality of sealant panels to each surface of the innerliner; each of said sealant panels formed by cutting a layer of sealant compound to the desired size and shape, placing said layer of sealant compound between two layers of cloth fabric of the desired sizes and shapes and rubberized on the sides remote from the sealant compound layer, said fabric layers extending beyond the edges of the sealant compound, sewing the cloth fabric and sealant compound layers with substantially parallel rows of stitches, and forming connecting flanges by sewing together the fabric layers extending beyond the sealant compound with circumferential stitches adjacent the edges of the sealant compound layer;
   c. cementing the flanges of each panel to the flanges of the adjacent panels;
   d. applying a fuel barrier layer to the outer surface of the sealant panels and joints;
   e. cementing an outer covering layer to the external surface of the fuel barrier;
   f. applying a coating of fuel resistant lacquer to the outer surface of the covering layer;
   g. curing the tank for two hours at 260° F. under 60 psig steam pressure; and
   h. removing said building form from the cured tank.

2. The method as recited in claim 1 further comprising cementing rubber strips to said flanges prior to cementing said outer covering layer.

* * * * *